United States Patent
Hu et al.

(10) Patent No.: US 10,230,564 B1
(45) Date of Patent: Mar. 12, 2019

(54) AUTOMATIC ACCOUNT MANAGEMENT AND DEVICE REGISTRATION

(75) Inventors: Luhui Hu, Bothell, WA (US); Jonathan A. Leblang, Menlo Park, CA (US); David J. Zimmer, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 827 days.

(21) Appl. No.: 13/098,139

(22) Filed: Apr. 29, 2011

(51) Int. Cl.
*G06F 17/30* (2006.01)
*H04L 29/06* (2006.01)

(52) U.S. Cl.
CPC .... *H04L 29/06768* (2013.01); *H04L 63/0838* (2013.01)

(58) Field of Classification Search
CPC .. H04L 63/0815; H04L 63/0838; G06F 21/33
USPC ...................... 726/4, 6, 8; 713/183
See application file for complete search history.

(56) References Cited

U.S. PATENT DOCUMENTS

| | | | |
|---|---|---|---|
| 7,877,299 B2 | 1/2011 | Bui | |
| 7,966,259 B1 | 6/2011 | Bui | |
| 8,160,935 B2 | 4/2012 | Bui | |
| 8,185,938 B2 * | 5/2012 | Benantar | 726/8 |
| 8,355,959 B2 | 1/2013 | Bui | |
| 8,707,378 B2 * | 4/2014 | Nambakkam | H04N 21/2225 707/610 |
| 2002/0144119 A1 * | 10/2002 | Benantar | 713/171 |
| 2004/0025056 A1 * | 2/2004 | Katsube | G06F 21/10 726/7 |
| 2005/0210270 A1 * | 9/2005 | Rohatgi et al. | 713/186 |
| 2006/0075224 A1 * | 4/2006 | Tao | 713/164 |
| 2006/0218630 A1 * | 9/2006 | Pearson | G06F 21/41 726/8 |
| 2007/0180508 A1 * | 8/2007 | Thomson | 726/8 |
| 2007/0186106 A1 * | 8/2007 | Ting et al. | 713/168 |
| 2008/0010298 A1 * | 1/2008 | Steele et al. | 707/10 |
| 2009/0240597 A1 | 9/2009 | Oswald | |
| 2009/0292927 A1 * | 11/2009 | Wenzel | H04L 63/0815 713/185 |
| 2010/0010902 A1 | 1/2010 | Casey | |
| 2010/0057552 A1 | 3/2010 | O'Leary et al. | |
| 2010/0262544 A1 * | 10/2010 | Levchin et al. | 705/44 |
| 2011/0055585 A1 * | 3/2011 | Lee | H04L 9/0844 713/183 |
| 2011/0270909 A1 * | 11/2011 | Fu | 709/203 |

(Continued)

OTHER PUBLICATIONS

Adabala et al., 2004, IEEE, pp. 1-8.*

(Continued)

*Primary Examiner* — Luu T Pham
*Assistant Examiner* — Jenise E Jackson
(74) *Attorney, Agent, or Firm* — Lee & Hayes, P.C.

(57) ABSTRACT

A single sign-on system accepts master credentials from a user device and/or application, and automatically signs on to supported services using account credentials corresponding to those services. If the user has not created an account used by a particular device or application, the system can automatically interact with the account service to create the account. Similarly, if the device or application that relies on the account has not already been registered with the account, the system automatically interacts with the account to register the device or account.

29 Claims, 5 Drawing Sheets

(56) References Cited

U.S. PATENT DOCUMENTS

| | | | | |
|---|---|---|---|---|
| 2011/0277016 A1* | 11/2011 | Hockings et al. | ................. | 726/4 |
| 2011/0302412 A1* | 12/2011 | Deng et al. | ................... | 713/159 |
| 2012/0005738 A1* | 1/2012 | Manini | ............... | H04L 63/0209 |
| | | | | 726/7 |
| 2012/0023556 A1* | 1/2012 | Schultz | .................. | G06F 21/41 |
| | | | | 726/4 |
| 2012/0054625 A1* | 3/2012 | Pugh et al. | .................... | 715/736 |
| 2012/0079513 A1* | 3/2012 | Nahata | ............... | H04N 21/2225 |
| | | | | 725/5 |
| 2012/0096534 A1* | 4/2012 | Boulos | .................... | G06F 21/33 |
| | | | | 726/8 |
| 2012/0185391 A1* | 7/2012 | Sirota | ............. | G06Q 10/06315 |
| | | | | 705/44 |
| 2012/0198084 A1* | 8/2012 | Keskitalo | ................ | H04L 67/02 |
| | | | | 709/228 |
| 2012/0227094 A1* | 9/2012 | Begen et al. | ...................... | 726/4 |
| 2012/0246709 A1* | 9/2012 | Yip | ....................... | H04L 9/3226 |
| | | | | 726/8 |
| 2013/0081111 A1* | 3/2013 | Geller | .................... | G06F 21/31 |
| | | | | 726/4 |
| 2013/0179345 A1 | 7/2013 | Bui | | |
| 2014/0101745 A1* | 4/2014 | Sirota | ............. | G06Q 10/06315 |
| | | | | 726/8 |
| 2014/0365373 A1* | 12/2014 | Pelegero | ................ | G06Q 20/12 |
| | | | | 705/44 |
| 2016/0234201 A1* | 8/2016 | Sirota | ............. | G06Q 10/06315 |

OTHER PUBLICATIONS

Qiang et al, 2010, IEEE, pp. 458-464.*

Nunome et al, Development of an E-learning Back-end System for Code Assessment in Elementary Programming Practice, ACM, Oct. 27, 2010, pp. 181-186.*

Sun et al, A Billion Keys, but Few Locks: The Crisis of Web Single Sign-On, ACM, Sep. 23, 2010, pp. 61-71.*

Office action for U.S. Appl. No. 13/098,160, dated Sep. 10, 2013, Hu et al., "Transaction Processing and Support for Physical-Presence Merchants", 21 pages.

Office Action for U.S. Appl. No. 13/098,160, dated Apr. 11, 2014, Luhui Hu, "Transaction Processing and Support for Physical-Presence Merchants", 23 pages.

\* cited by examiner

US 10,230,564 B1

AUTOMATIC ACCOUNT MANAGEMENT AND DEVICE REGISTRATION

BACKGROUND

In the current digital world, a person may have many electronic devices and many online accounts, each of which may be protected or secured by different security credentials. Devices may include mobile phones, pagers, computers, electronic book reader devices, navigation devices, and many other devices having data communications capabilities and computer or computer-like functionality. User or service accounts may include bank online accounts, credit card online accounts, mortgage online accounts, web-based email accounts, social network accounts, and so forth.

Security credentials for a particular device or account may comprise one or more of a username, password, security phrase, and other security factors.

It is increasingly common for electronic devices such as mentioned above to rely upon user accounts as support for core functionality of the devices. For example, a tablet computer may rely upon an account with a telecommunications provider for its ability to communicate over the Internet. As another example, a book reader device or other personal media device may rely upon an online account to obtain books or other media for consumption on the media device. The association between the device and an account of the user is often created by the user during an initialization or configuration process, in which the user provides security credentials for an account that has been previously created.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes systems, devices, and techniques that facilitate usage of multiple local and online accounts by user devices and applications, including computers, mobile devices, and similar equipment that may rely upon the services enabled by such online and local accounts.

These systems, devices, and techniques are described in the context of a single sign-on system that keeps track of account information for multiple accounts associated with a user. In particular, the single sign-on system stores security credentials for different accounts of the user. In addition, the single sign-on system implements automatic sign-on, account creation, and application/device registration services, thereby minimizing the amount of information that users need to provide when using their devices, and particularly when initially configuring their devices.

Credential Management Infrastructure

Figure 1:
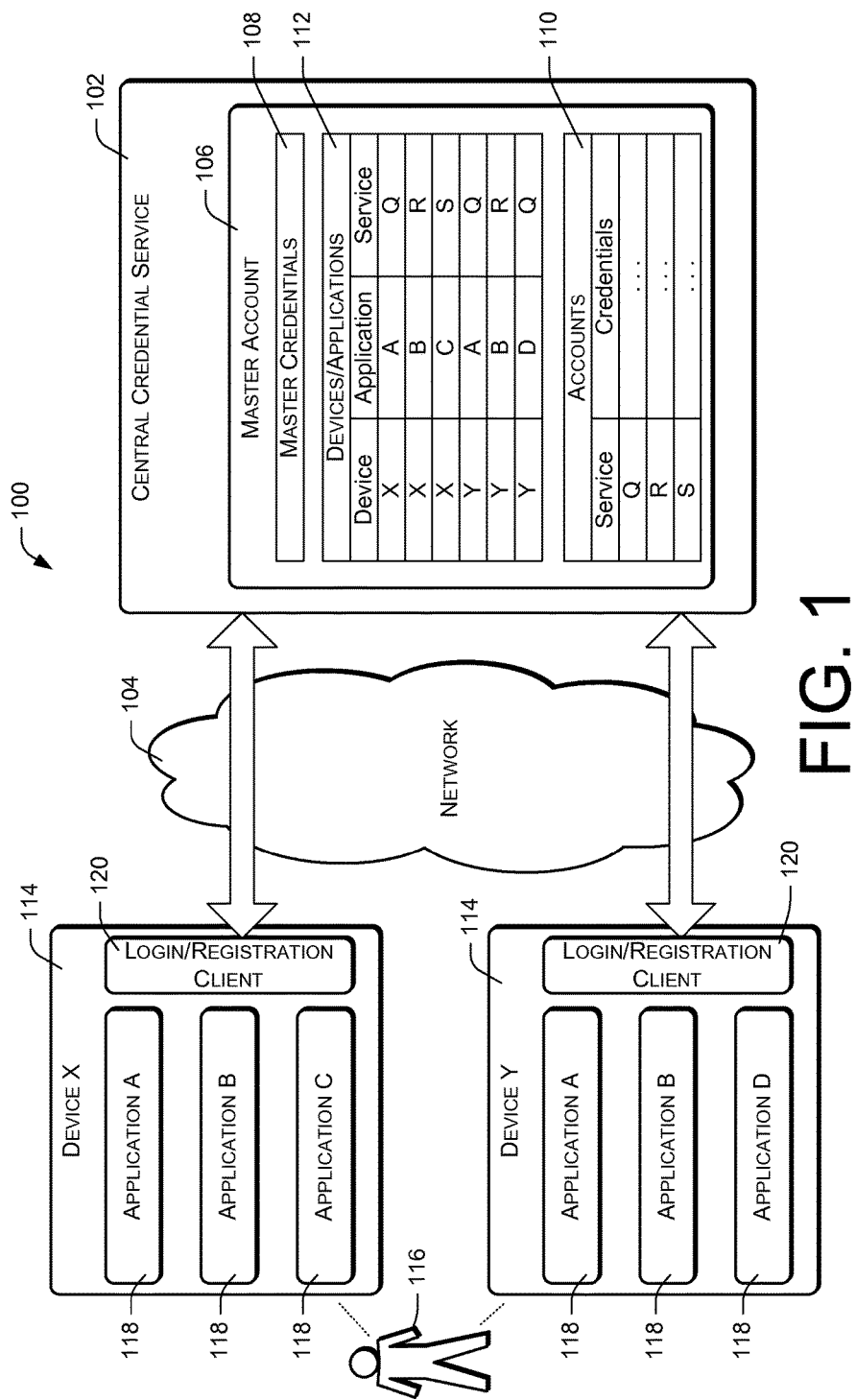
FIG. 1 is a block diagram illustrating an online environment in which the account management and registration techniques described herein may be implemented.

FIG. 1 illustrates elements of an environment or infrastructure 100 in which these techniques may, in one example, be implemented and practiced. The infrastructure 100 includes a central credential service 102 that is accessible through a network 104 such as the Internet and/or associated connecting networks. The credential service 102 facilitates what have become known as single sign-on capabilities, allowing a user to sign on or log in to a variety of disparate services and providers after submitting only a single set of master security credentials. Note that although various concepts and techniques are described below within the environment of FIG. 1, these concepts and techniques may also be implemented separately, in different environments, and in different combinations.

In the example of FIG. 1, the credential service 102 maintains a master account 106 for each of multiple users. Although only a single master account 106 is shown in FIG. 1, the credential service 102 may typically maintain multiple master accounts 106, corresponding to multiple different users. Each user will usually have only a single master account 106.

The master account 106 may be protected and secured by master credentials 108. The master credentials 108 may comprise one or more of various security factors, including username, password, passphrase, biometric information, cryptographic codes, images, and so forth. The master credentials 108 may be stored by the master account 106. Alternatively, the master account 106 may store encrypted information that is related to the master credentials in a way that allows the credential service 102 to verify the correctness of user-submitted master credentials.

The master account 106 also stores user account credentials, corresponding to accounts provided for a user by different services and providers. FIG. 1 illustrates the user account credentials in a table 110 referred to as the "Accounts" table 110, although various different storage structures may be used for this purpose, including more complex relational database structures. In this embodiment, the accounts table 110 has a first column, titled "Service," which indicates services or providers that have user accounts for the user. Each service entry may indicate the source or address of the service or provider, such as the Internet URL (uniform resource locator) of the service or provider. For example, an email account with a particular provider, whose web address is "email.com," may be identified by its Internet address: "email.com." Other types of identifiers may alternatively be used in the service column. These identifiers indicate types, sources, or providers of accounts, rather than individual instances of accounts.

A second column, titled "Credentials," contains the actual account credentials held by the user with respect to the accounts indicated by the Name column. The credentials may be stored in an encrypted format, and may include various types of information to be used for identifying and accessing different user accounts. The user account credentials may comprise one or more of various security factors, including username, password, passphrase, biometric information, cryptographic codes, images, and so forth. Generally, the user account credentials allow the identification of a particular account held by the user with the service or provider indicated by the corresponding service field, as well as information enabling access to that account. The process of gaining access to an account is often referred to as "signing on" to the account, although the process of authorization may be implemented in various ways.

Note that the accounts referenced by the accounts table 110 may be with various entities and institutions, different than and separate from the provider of the credential service 102. These accounts may comprise many different types of online and offline accounts, including banking accounts, email accounts, social network accounts, membership accounts, service accounts, online applications, local-device applications, and so forth.

The master account 106 may in some embodiments implement a devices/applications table 112, which may be used to keep track of user accounts that are being used by different user devices and applications. Further details of the devices/applications table 112, and its uses, will be described in more detail below.

The central credential service 102 is configured to receive sign-on requests from various user devices 114. FIG. 1 shows two user devices 114, "Device X" and "Device Y," which are associated with a single user 116. Actual embodiments may of course include many more such user devices, associated with many different users.

Each of the user devices 114 has a plurality of components or applications 118 that may at times need to be authorized with or to "sign on" to various services in order to support or enable their own functionality or to enable access to online accounts upon which their functionality may rely. In some cases, the user 116 may be prompted to present or enter such credentials, which may be different for each application 118 or user account. However, each of the user devices 114 may also have a login/registration client 120 that allows the applications 118 to utilize the services of credential service 102 to sign on to their accounts. The login/registration client 120 may be implemented as a local service executing on each device. Alternatively, the login/registration client 120 may be implemented as one or more plug-ins or sub-components that are incorporated or referenced by each of the applications 118 during their execution.

Figure 2:
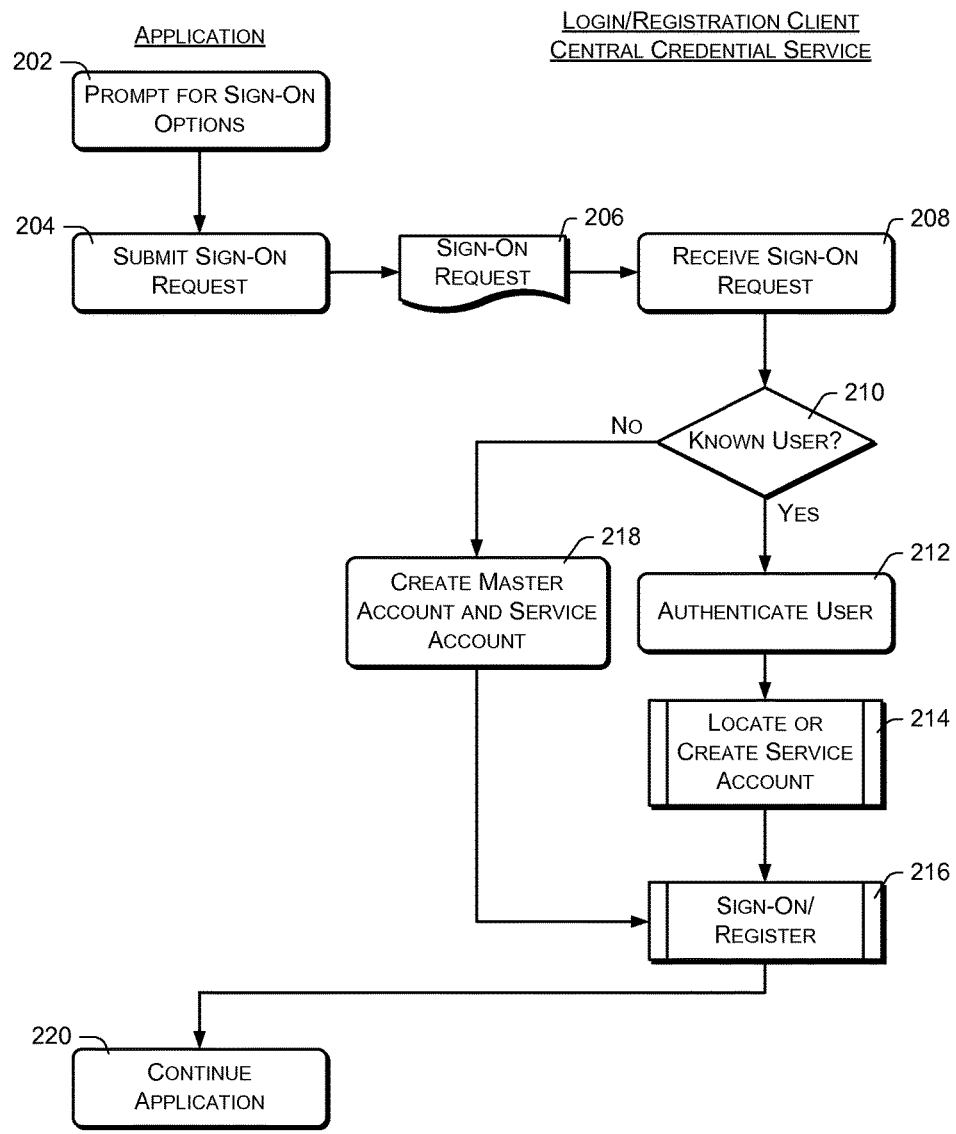
FIG. 2 is a flow diagram illustrating an example login/registration process in a system such as shown in FIG. 1.

FIG. 2 illustrates generally how an application or component 118 may interact with the login/registration client 120 and credential service 102 in order to provide local device access to online accounts of the user 116, using security credentials stored by the central credential service 102. Actions performed by the application 118 are shown along the left of FIG. 2. Actions performed or services provided by the login/registration client 120 and/or credential service 102 are shown along the right of FIG. 2. Generally, the login/registration client 120 may act in cooperation with the credential service 102 to implement the described actions, and for descriptive purposes the login/registration client 120 and credential service 102 may be considered to be distributed elements of a single functional component. In some cases, various information may be cached by the login/registration client 120 on the local device 114, and the login/registration client 120 may thus provide the described services without access to the credential service 102. In other cases, certain of the actions on the right side of FIG. 2 may be performed by the credential service 102. Generally, the actions depicted by FIG. 2 may be performed in different combinations and in different orders than shown, and the described responsibilities may be divided or apportioned between various components and actors in different ways.

An action 202, performed by the application 118, comprises presenting sign-on options to the user 116 with respect to a user account upon which the application 118 bases at least a portion of its services. For example, if the application is an email client, the user account may comprise an email account with an email services provider. The presented sign-on options may include an option to use the single sign-on services provided by the central credential service 102. In some embodiments, the application 118 may be configured to omit the action 202, and to routinely utilize the central credential service 102 without specific instructions from the user 116.

Assuming that the user selects the use of single sign-on services, an action 204 comprises submitting a sign-on request 206 to the login/registration client 120. The sign-on request 206 may indicate or specify an account service, corresponding to the service column of the accounts table 110. As described above, the account service entry may indicate a service or provider that supports user accounts of a particular type. In some cases, the account service may comprise the Internet URL of the provider or service from which the account is supported. Note that the sign-on request 206 does not need to specify the particular account instance belonging to the user 116. Neither does the sign-on request 206 need to include the security credentials or other sign-on information related to the account of the user.

The sign-on request may include a user identification, potentially corresponding to an individual master account 106. The user identification may comprise a user name, which may be an arbitrary character sequence, an email address, or some other type of uniquely identifying information. The user identification may in some situations include security credentials such as a password, biometric information, or other security factors. Biometric information may include things such as fingerprints, voice samples, retinal patterns, and so forth. Security factors may also include different types of user secrets, and may be provided by the user in various different ways.

In some embodiments the sign-on request 206 may also, or alternatively, specify an application ID indicating the application from which the request originates, and a device ID uniquely identifying the device upon which the application is executing.

At 208, the login/registration client 120 receives the sign-on request 206.

At 210, login/registration client 120 and/or the credential service 102 determines whether the sign-on request 206 specifies a user that is already known to the login/registration client 120 and/or the credential service 102. More specifically, the login/registration client 120 and/or the credential service 102 determine whether the indicated user already has a master account 106. This determination can be made by determining whether the user identification indicated with the sign-on request corresponds to any existing master account.

If the submitted user identification does correspond to a known master account, the login/registration client 120 and/or the credential service 102 authenticates the user at 212. Authentication 212 may comprise validating master credentials submitted by the user 116 against the master credentials 108 that are associated with the user's master account. The user-submitted master credentials may have been obtained by prompting the user for such credentials. This prompting may have been performed by the application 118 and the resulting credentials may have been included in or referenced by the sign-on request 206. Alternatively, the login/registration client 120 or the credential service 102 may prompt the user for master credentials, after receiving the sign-on request 206. Thus, the authentication 212 may include soliciting the user for the user's master security credentials.

Assuming successful authentication at 212, an action 214 comprises locating user account information corresponding to the account service specified by the sign-on request 206. In the embodiment of FIG. 1, each row of the accounts table 110 may correspond to such an account service. If the credential service 102 has not already recorded an account corresponding to the user for the account service specified by the sign-on request 206, an account instance may be created with the service or provider in action 214, and a corresponding entry added to the accounts table 110. Further details regarding action 214 will be described in more detail below, with reference to FIGS. 3 and 4.

After identifying or creating a user account corresponding to the account service specified by the sign-on request 206, an action 216 comprises signing on to the user account and in some cases registering the application 118 or device 114 with the user account. The action 216, which includes signing on or authorizing the application to perform some action or access some resource, may comprise providing user account credentials to an online service such as a banking service, email service, or other type of online service or source. Alternatively, account credentials may be used to authorize operations that are local to the device 114, or for other authorization purposes. The account credentials may be stored in and retrieved from the accounts table 110 or other data store.

Normal application operation then continues at 220.

As will be described with reference to FIG. 5, signing on and/or registering may be performed automatically on behalf of the application 118 and/or the user 116.

If at 210 it is determined that the user indicated by the sign-on request 206 is not known, and does not have an existing master account 106, an action 218 is performed of creating a master account 106 for the user. In certain embodiments, this may be performed automatically, without the need for further user interaction, based on minimal information such as the user identification contained in or indicated by the sign-on request. In cases where the sign-on request indicates one or more user security credentials, such as a password, these security credentials may be associated automatically with the newly created master account. In other cases, security credentials such as a password may be automatically generated and associated with the new master account, and emailed or otherwise communicated to the user.

In one embodiment, the user identification submitted as part of the sign-on request 206 may include a user name, in the form of an email address, and an associated password. If the email address is already associated with a master account, and if the password matches the password of the master account, the user is associated with that master account. If on the other hand the email address is not already associated with a master account, a master account is created and associated with the email address and the password indicated by the sign-on request.

The action 218 may also include creating an online or service account on behalf of the user. For example, in situations where the sign-on request indicates a specific service account, the service account may be created automatically based on the user identification specified by the sign-on request 206.

After the account creation of 218, the user or user device is signed on and/or registered with an online account at 216.

Figure 3:
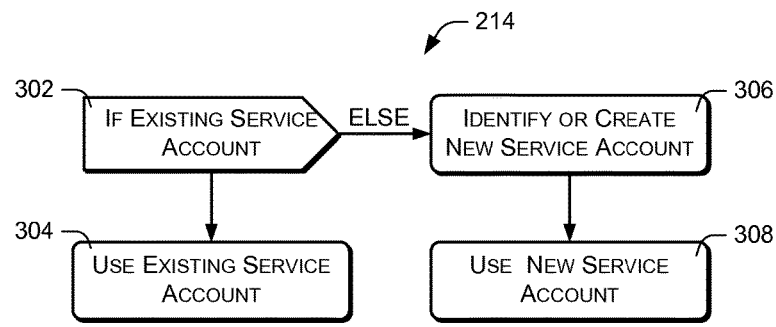
FIGS. 3 and 4 are flow diagrams illustrating examples of locating and/or creating a user account during the login/registration process of FIG. 2.

FIG. 3 shows an example implementation of action 214, which comprises locating or creating a user account instance corresponding to the account service specified by the sign-on request 206. An action 302 comprises determining whether such an account already exists and is known to the login/registration client 120 and/or credential service 102. If the account already exists and is known to login/registration client 120 and/or credential service 102, an action 304 is performed, which comprises selecting or using the existing and known account, along with user security credentials that have been previously associated with the account in the accounts table 110.

Otherwise, if a user account corresponding to the specified account service is not already known to login/registration client 120 and/or credential service 102, a new account is identified or created at 306. This may comprise interacting with the service or provider that is to provide the account, and supplying user information such as a user name and other security credentials. In some situations, the user may be prompted at this point to supply credentials for an account that already exists, but is not known to the login/registration client 120 and/or credential service 102. In other cases, or if the user indicates that there is no such existing account, a new account may be automatically created on behalf of the user by interacting with the online service or provider. The new account may be configured to use credentials supplied by the user, or credentials (such as usernames and passwords) may be chosen automatically and/or randomly on behalf of the user. At 308, the new account is selected as the result of the action or procedure 214. An entry is added to the accounts table 110 to record the existence of this new account.

Figure 4:
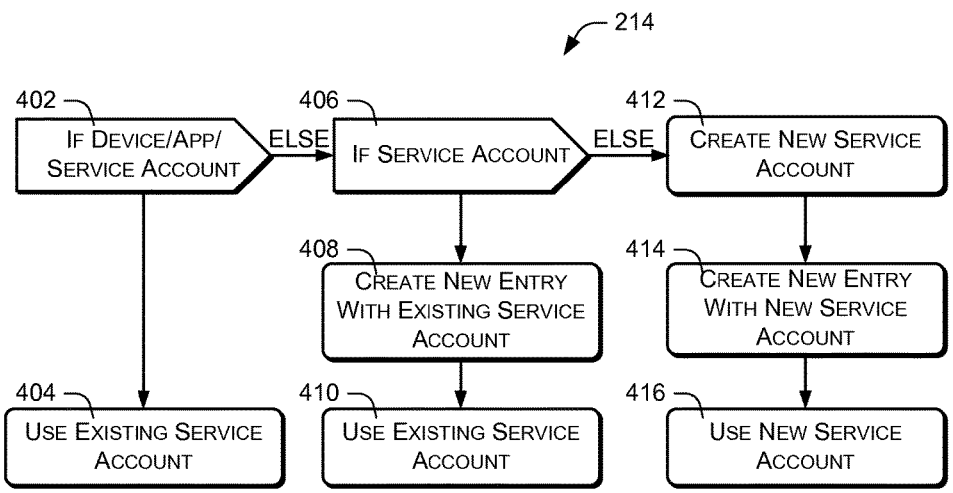

FIG. 4 shows another example implementation of action 214. This example uses the devices/applications table 112 (FIG. 1) to keep track of devices and applications for which accounts and security credentials are already known. Devices/applications table 112 has three columns and multiple rows or entries. Each entry has fields corresponding to the three columns of the table 112.

A first column of the devices/application table 112, titled "Device," designates fields containing a device name or unique device identifier. In the example of FIG. 1, there are two devices 114, X and Y, associated with the user 116. These are designated within the first column of devices/applications table 112 by the identifiers "X" and "Y."

A second column of the table 112, titled "Application," designates fields containing an application name or identifier. In the example of FIG. 1, the user's two devices 114 have four different applications: A, B, C, and D. These are designated within the second column of the devices/applications table 112 by the identifiers "A," "B," "C," and "D."

A third column of table 112, titled "Account," designates fields containing an account service, which corresponds to one of the entries of the accounts table 110. The user 116 in this example has three account, shown in the accounts table 110 as accounts Q, R, and S. Each entry of the devices/applications table 112 designates one of these accounts in its account column.

Thus, each entry of the devices/applications table 112 designates a device, an application residing on that device, and an account service. The security credentials associated with each user account are stored in the accounts table 110.

The example procedure 214 of FIG. 4 is performed in response to receiving the sign-on request 206. In this example, the sign-on request 206 indicates or references a device ID, an application ID, and an account service, corresponding respectively to the fields of the first, second, and third columns of the devices/applications table 112.

An action 402 comprises determining whether there is a current entry in the devices/applications table 112 that specifies the same device and application as indicated by the sign-on request 206. If there is such an existing entry in the devices/applications table 112, an action 404 selects that existing account as the result of the action or procedure 212.

Otherwise, if there is not a current entry in the devices/applications table 112 that specifies the same device and application as indicated by the sign-on request 206, an action 406 is performed, comprising determining whether there is an existing entry in the accounts table 110 that specifies an account with the same account service as indicated by the sign-on request 206. If there is such an existing entry in the accounts table 110, an action 408 creates a new entry in the devices/applications table 112, specifying the device, application, and account service that are indicated by the sign-on request 206. An action 410 then specifies that existing account as the returned result of the action or procedure 214.

Otherwise, if there is not an existing entry in the accounts table 110 that specifies the same account service as indicated by the sign-on request 206, an action 412 is performed, creating a new account that corresponds to the account service specified in the sign-on request 206. In some situations, the user may be prompted at this point to supply credentials for an account that already exists, but is not known to the login/registration client 120 and/or credential service 102. In other cases, or if the user indicates that there is no such existing account, a new account may be automatically created on behalf of the user. The new account may be configured to use credentials supplied by the user, or credentials (such as usernames and passwords) may be chosen automatically and/or randomly on behalf of the user.

An action 414 is then performed, which comprises creating a new entry in the devices/applications table 112 specifying the device, application, and account service that are indicated by the sign-on request 206. An action 416 then specifies the new account as the returned result of the action or procedure 212.

Figure 5:
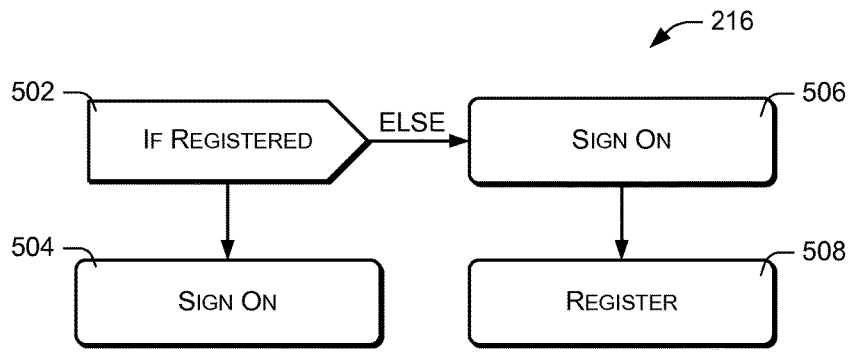
FIG. 5 is a flow diagram illustrating an example of registering with and signing on to a user account during the login/registration process of FIG. 2.

FIG. 5 illustrates an example implementation of action 216 of FIG. 2, which comprises signing on and registering on behalf of the application ID 118. An action 502 comprises determining whether the requesting application 118 is already registered with the service or provider. If it is, an action 504 is performed of signing on to the user account with the service or provider.

Otherwise, if the requesting application is not already registered with the service or provider, an action 506 is performed signing on to the user account with the service or provider, and an action 508 is performed of registering the application on behalf of the user, without any further instructions from the user.

Note that registration may need be required or needed in some situations, and may thus be omitted in those circumstances.

Figure 6:
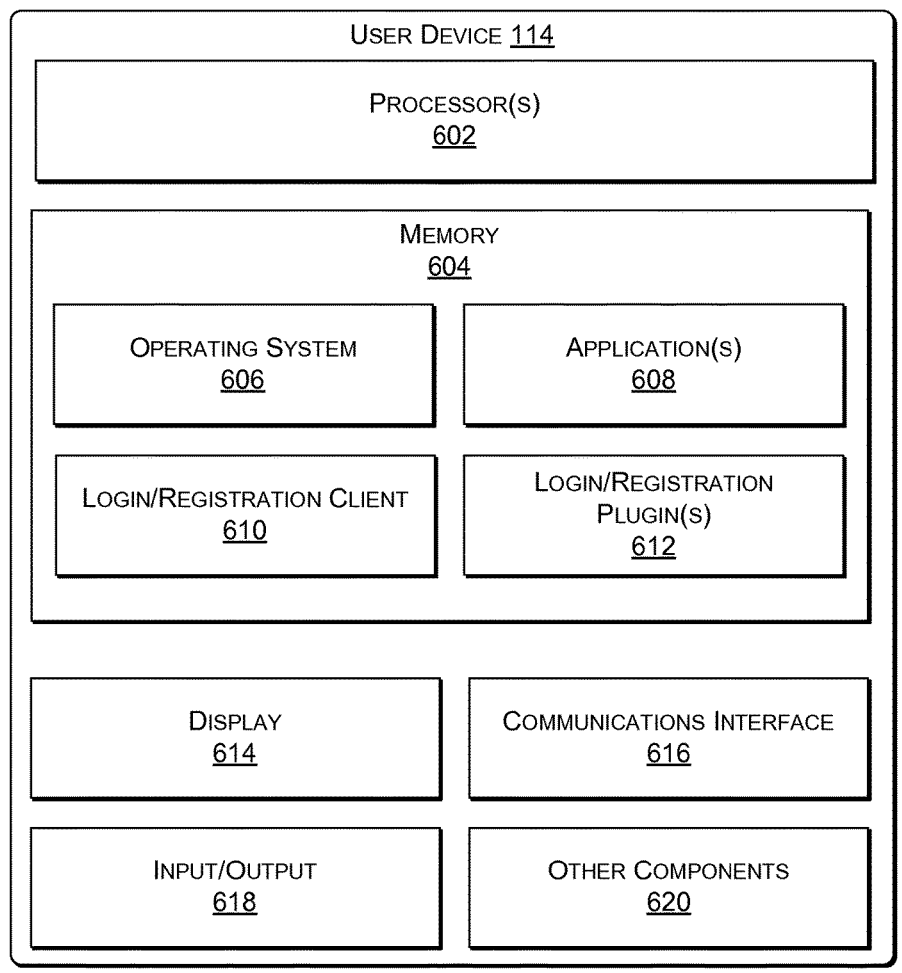
FIG. 6 is a block diagram illustrating high-level components of a device such as may be used in the environment of FIG. 1.

FIG. 6 illustrates relevant components of a user device 114 such as might be used in conjunction with the techniques described above. The device 114 may include a processing unit composed of one or more processors 602 and memory 604. Depending on the configuration of the device 114, the memory 604 may comprise computer storage media and may include volatile and nonvolatile memory. Thus, the memory 604 may include, but is not limited to, RAM, ROM, EEPROM, flash memory, or other memory technology, or any other medium which can be used to store media items or applications and data which can be accessed by the device 114.

The memory 604 may support a local cache to enable operation and fast access to master account data during temporary situations in which the device may not have network access.

The memory 604 may be used to store any number of functional components and/or operational logic modules that are executable on the processor 602, as well as data associated with the components and modules. Thus, the memory 604 may store an operating system 606 and one or more applications 608. The applications may be native device applications and may in some cases be considered part of the operating system 606. Some such applications may provide core functionality of the device 114, such as book-reading functions in an electronic book reader device, communications capabilities in a telecommunications device, and so forth. The applications may also comprise installed applications, which are installed by a user or other entity after device manufacture and distribution. Such user-installed applications may provide additional, enhanced, or supplemental functionality related to core device operations, and/or may provide completely new functionality to the device 114.

To facilitate the sign-on functionality described herein, the device 114 may include a login/registration client 610 and/or one or more login/registration plugins 612. Either type of component may provide similar functionality in conjunction with applications 608. A single login/registration client 610 may provide central local services that can be accessed by a plurality of applications 608. On the other hand, multiple login/registration plugins 612 may be incorporated into respective applications 608.

The login/registration client 610 can be configured to support account services for many different services or providers, each of which may use different procedures to establish accounts and to sign on to such accounts. Similarly, login/registration plugins 612 can be developed for use with different services and providers. In some embodiments, separate clients 610 and/or plugins 612 may be used for login and registration services.

The device 114 may further include a display 614 and/or other user interface components. A communications interface 616 may support wired and/or wireless connection to various entities and services, such as to the credentials server 102 and to other services and providers that maintain accounts for users. In some implementations, the communications interface 616 may comprise a network interface, allowing communications over networks such as cellular networks, radio, WiFi networks, short range networks (e.g., Bluetooth), IR, and so forth.

The device 114 may further be equipped with various input/output (I/O) components 618. These may include touch-screen sensors, keys, keypads, buttons, and so forth, which may be used in conjunction with user interface functions.

The device 114 may have various additional components 620 to support its intended operation. For example, it may also include additional data storage devices (removable and/or non-removable) such as magnetic disks, optical disks, or tape. The additional data storage media may include volatile and nonvolatile, removable and non-removable media implemented in any method or technology for storage of information, such as computer readable instructions, data structures, program modules, or other data.

Figure 7:
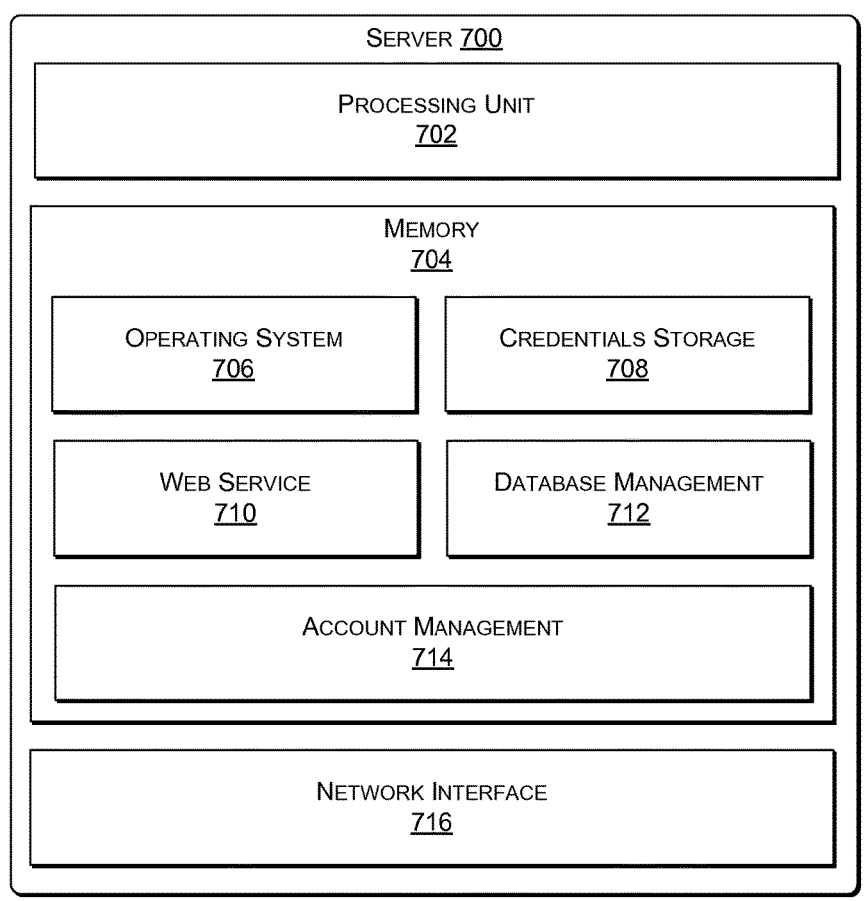
FIG. 7 is a block diagram showing high-level components of a computer server that may be used to implement the central credential service of FIG. 1.

FIG. 7 illustrates relevant components of a server 700 that may be used to implement the functionality of the credentials service 102. Generally, the credentials services may be implemented by one or more servers, with the various functionality described above distributed in various ways across the different servers. Servers may be located together or separately, and organized as virtual servers, server banks, and/or server farms, or implemented by cloud computing services. The described functionality may be provided by the servers of a single entity or enterprise, or may utilize the servers and/or services of multiple entities or enterprises.

In a very basic configuration, the example server 700 might comprise a processing unit 702 composed one of one or more processors, and memory 704. The memory 704 may comprise computer storage media and may include volatile and nonvolatile memory. Thus, the memory 704 may include, but is not limited to, RAM, ROM, EEPROM, flash memory, or other memory technology, or any other medium which can be used to store media items, applications, and data that can be accessed by the server 700. Note that the functions of these components may in some implementations be supplied by cloud computing services and/or cloud-based infrastructure.

The memory 704 may be used to store any number of functional components, such as programs and program modules, that are executable on the processing unit 702. Thus, the memory 704 may store an operating system 706 and a credentials storage support module 708 that operates in conjunction with the operating system 706 to perform the actions described above with reference to FIGS. 1-5.

Functional components of the server 700 may also comprise a web service component 710 that interacts with individual devices and applications executing on such devices. The server 700 may also include various database management components 712 for supporting the operations of the credentials storage support module 708.

An account management component 714 may implement many of the operations discussed above, and may provide additional functionality. For example, the management component 714 of a server may provide login and registration monitoring for preventing malicious intrusions or breaches. Such monitoring may allow the user to designate email addresses or phone numbers for receiving alerts regarding account activities. Such alerts may be based on different preferences set by the user. Available options may include notification when logging in some accounts, notification when registering some accounts, and notification if retrieving some login credential information. This mechanism may ensure the user about the security of the system, while also making sure the user is aware of the activities of his or her online accounts.

The account management component 714 may also keep track of the status of device registrations and online accounts, such as devices that need to be registered and accounts that have been closed. Based on user preferences, the system may access online accounts to check their status. To maintain flexibility, the user may be given the ability to toggle the status of device registration and online accounts. Based on the specified status, the system may take appropriate follow-up actions. If a device registration fails, for example, the system may try again later and send out a notification when the registration has been completed.

The account management component 714 may also maintain a history of registrations and sign-ons for auditing and other purposes. The system may gather this information from the login registration client 120.

The server 700 may also include a network interface 716 to allow communications with merchant and customer devices.

The server 700 may of course include many other logical, programmatic, and physical components, of which those shown in FIG. 7 are merely examples that are related to the discussion herein.

CONCLUSION

Note that the various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   under control of one or more processors configured with executable instructions which, in response to being performed by the one or more processors perform actions including:
   storing a first data structure that includes a device identifier, and an application identifier associated with a master account;
   storing a second data structure that includes an account service identifier associated with the master account;
   receiving, from a device, a sign-on request for a device application that relies on a user account for an account service, wherein the sign-on request indicates a device identifier of the device, an application identifier of the device application, and an account service identifier of the account service;
   receiving master credentials in order to access the entries stored in the master account; authenticating based at least in part on master credentials associated with the master account in order to access entries associated with the master account;

determining whether an entry exists within a first data structure that specifies the same device identifier and the application identifier indicated in the sign-on request;

signing on to the user account with respect to the device application in response to determining that the first data structure specifies the device identifier and the application identifier indicated in the sign-on request; and in response to determining that one or more of the device identifier or the application identifier does not exist within the first data structure, determining whether there is an existing entry in a second data structure that specifies the account service associated with the account service identifier, in response to determining that there is the existing entry in the second data structure that corresponds to the same account service identifier indicated in the sign-on request, creating one or more entries in the first data structure to specify the device identifier, the application identifier, and the account service identifier, in response to determining that there is not an existing entry of the account service identifier in the second data structure, creating one or more entries in the second data structure to add the user account for the account service, and signing on to the user account to access the account service.

2. The computer-implemented method of claim 1, wherein the device application comprises a native device element.

3. The computer-implemented method of claim 1, wherein signing on to the user account with respect to the device application is performed with stored account credentials corresponding to the user account.

4. The computer-implemented method of claim 1, wherein signing on to the user account with respect to the device application is performed with stored account credentials other than the master credentials.

5. The computer-implemented method of claim 1, further comprising:

soliciting the user for account credentials corresponding to the user account; and storing the solicited account credentials.

6. The computer-implemented method of claim 1, wherein the actions are performed in cooperation by a client component and an online server.

7. The computer-implemented method of claim 1, wherein the actions are performed in cooperation with an application plug-in component.

8. The computer-implemented method of claim 1, wherein the actions are performed in cooperation with a device component.

9. The computer-implemented method of claim 1, wherein the actions are performed in cooperation with an online server.

10. The computer-implemented method of claim 1, further comprising soliciting a user for information to be associated with the user account.

11. The computer-implemented method of claim 1, further comprising soliciting a user for a user identification to be associated with the user account.

12. A system comprising:

one or more hardware processors;

one or more computer-readable media containing instructions that are executable by the one or more hardware processors to perform actions comprising:

storing a first data structure that includes a device identifier, and an application identifier associated with a master account;

storing a second data structure that includes an account service identifier associated with the master account;

receiving, from a device, a sign-on request for a device application that relies on a user account for an account service, wherein the sign-on request indicates a device identifier of the device, an application identifier of the device application, and an account service identifier of the account service;

receiving master credentials in order to access the entries stored in the master account;

authenticating based at least in part on master credentials associated with the master account in order to access entries associated with the master account;

determining whether an entry exists within a first data structure that specifies the same device identifier and the application identifier indicated in the sign-on request;

signing on to the user account with respect to the device application in response to determining that the first data structure specifies the device identifier and the application identifier indicated in the sign-on request; and in response to determining that one or more of the device identifier or the application identifier does not exist within the first data structure, determining whether there is an existing entry in a second data structure that specifies the account service associated with the account service identifier, in response to determining that there is the existing entry in the second data structure that corresponds to the same account service identifier indicated in the sign-on request, creating one or more entries in the first data structure to specify the device identifier, the application identifier, and the account service identifier, in response to determining that there is not an existing entry of the account service identifier in the second data structure, creating one or more entries in the second data structure to add the user account for the account service, and signing on to the user account to access the account service.

13. The system of claim 12, wherein the device application comprises a native device element.

14. The system of claim 12, wherein signing on to the user account with respect to the device application is performed with stored account credentials other than the master credentials.

15. The system of claim 12, wherein the actions are performed in cooperation by a client component and an online server.

16. The system of claim 12, wherein the actions are performed in cooperation with an application plug-in component.

17. The system of claim 12, wherein the actions are performed in cooperation with a device component.

18. The system of claim 12, wherein the actions are performed in cooperation with an online server.

19. The system of claim 12, wherein the actions further comprise soliciting a user for information to be associated with the user account.

20. The system of claim 12, wherein the actions further comprise soliciting a user for a user identification to be associated with the user account.

21. A non-transitory computer-readable storage medium to store computer-executable instructions which, in response to being performed by a computing device, cause the computing device to perform actions comprising:
- storing a first data structure that includes a device identifier, and an application identifier associated with a master account;
- storing a second data structure that includes an account service identifier associated with the master account;
- receiving, from a device, a sign-on request for a device application that relies on a user account for an account service, wherein the sign-on request indicates a device identifier of the device, an application identifier of the device application, and an account service identifier of the account service;
- receiving master credentials in order to access the entries stored in the master account;
- authenticating based at least in part on master credentials associated with the master account in order to access entries associated with the master account;
- determining whether an entry exists within a first data structure that specifies the same device identifier and the application identifier indicated in the sign-on request;
- signing on to the user account with respect to the device application in response to determining that the first data structure specifies the device identifier and the application identifier indicated in the sign-on request; and
 - in response to determining that one or more of the device identifier or the application identifier does not exist within the first data structure,
- determining whether there is an existing entry in a second data structure that specifies the account service associated with the account service identifier,
 - in response to determining that there is the existing entry in the second data structure that corresponds to the same account service identifier indicated in the sign-on request, creating one or more entries in the first data structure to specify the device identifier, the application identifier, and the account service identifier,
 - in response to determining that there is not an existing entry of the account service identifier in the second data structure, creating one or more entries in the second data structure to add the user account for the account service, and
- signing on to the user account to access the account service.

22. The non-transitory computer-readable storage medium of claim 21, wherein the device application comprises a native device element.

23. The non-transitory computer-readable storage medium of claim 21, wherein signing on to the user account with respect to the device application is performed with stored account credentials other than the master credentials.

24. The non-transitory computer-readable storage medium of claim 21, wherein the actions are performed in cooperation by a client component and an online server.

25. The non-transitory computer-readable storage medium of claim 21, wherein the actions are performed in cooperation with an application plug-in component.

26. The non-transitory computer-readable storage medium of claim 21, wherein the actions are performed in cooperation with a device component.

27. The non-transitory computer-readable storage medium of claim 21, wherein the actions are performed in cooperation with an online server.

28. The non-transitory computer-readable storage medium of claim 21, wherein the actions further comprise soliciting a user for information to be associated with the user account.

29. The non-transitory computer-readable storage medium of claim 21, wherein the actions further comprise soliciting a user for a user identification to be associated with the user account.

* * * * *